United States Patent

[11] 3,623,639

| [72] | Inventor | Robert C. McShirley<br>917 Verdugo Circle Drive, Glendale, Calif. 91206 |
|---|---|---|
| [21] | Appl. No. | 56,770 |
| [22] | Filed | July 21, 1970 |
| [45] | Patented | Nov. 30, 1971 |

[54] POWDER-DISPENSING DEVICE
10 Claims, 5 Drawing Figs.

[52] U.S. Cl. .................................................. 222/108, 222/361
[51] Int. Cl. ................................................... B67d 1/16
[50] Field of Search............................................ 222/183, 216, 344, 345, 349, 351, 361–364, 450, 451, 453, 340, 384, 485, 108; 251/327, 328, 329

[56] References Cited
UNITED STATES PATENTS

| 2,761,588 | 9/1956 | Shields | 222/361 X |
| 2,749,005 | 6/1956 | Plusquellic | 222/485 X |
| 3,056,532 | 10/1962 | Germano | 222/361 |
| 3,521,793 | 7/1970 | McShirley | 222/361 |

Primary Examiner—Samuel F. Coleman
Assistant Examiner—Larry Martin
Attorney—Spensley, Horn and Lubitz ABSTRACT: Device for dispensing a measured volume of powder, having a cap member superimposed on a base member and defining at their mating surfaces a horizontally extending channel in which a metering member slides, the metering member containing a vertically extending passageway therethrough of the measured volume. The top and bottom of the channel are lined with resilient members such as plastic inserts each having a low-friction surface bearing against the metering member and defining a continuous peripheral trough to prevent escape of powder from the channel. The device is particularly adaptable for dispensing spherical alloys with partical sizes of a few microns.

PATENTED NOV 30 1971 3,623,639
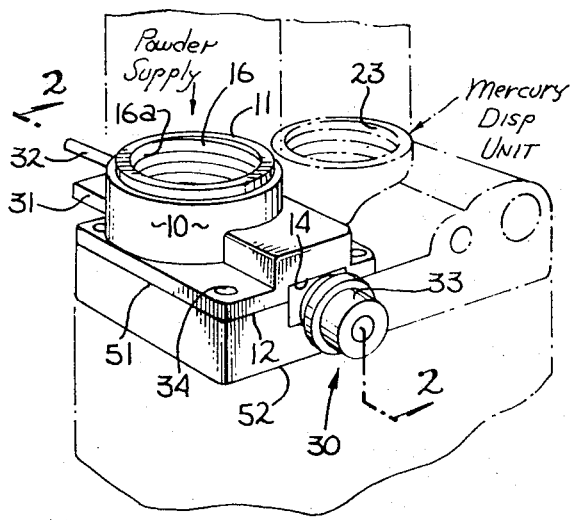
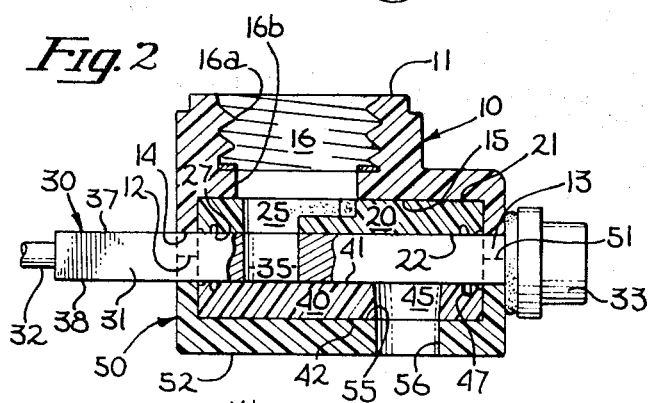
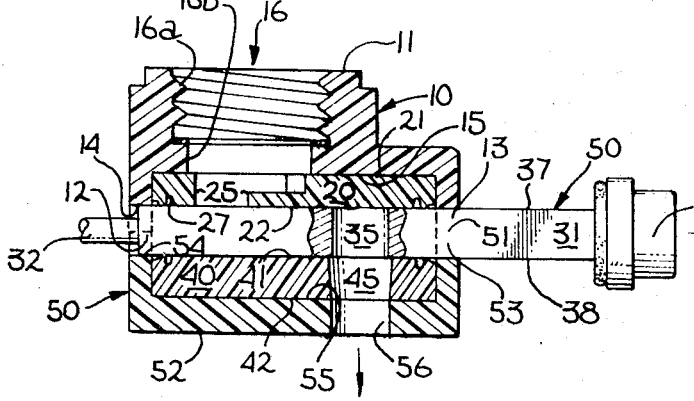
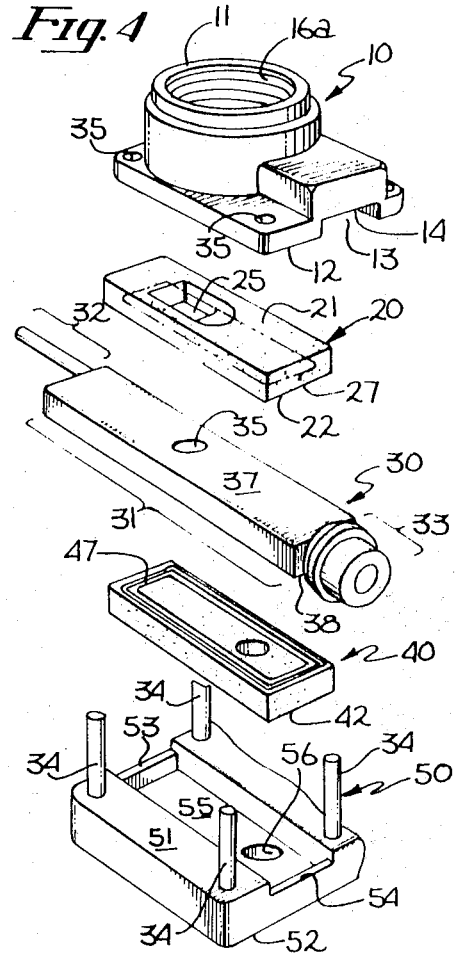
ROBERT C. McSHIRLEY
INVENTOR
BY
Spensley, Horn & Lubitz
ATTORNEYS

POWDER-DISPENSING DEVICE

BACKGROUND OF THE INVENTION

Professional practitioners have frequent need to efficiently dispense accurately measured quantities of powder, such as a dentist's dispensing of spherical alloys in the preparation of filling materials. Although there is presently used in the art a type of dispensing device using a sliding metering member having a vertical passageway defining a transfer chamber, such devices are not very practical. Typically, the outer surfaces of the sliding member and the bearing surfaces of the channel in which it slides are metal and are honed or lapped for as close and friction-free fit as possible to prevent the powder from passing therebetween and to allow easy movement of the metering member. Thus the device must be constructed to quite close tolerances and hence is relatively expensive. Furthermore, with usage the powder (particularly with partical sizes of a few microns) that does pass between the surfaces of the channel and the sliding member built up and tend to force apart the sliding member from the bearing surfaces and cause a binding of the metering bar. Thus the metering member must be frequently taken out and cleaned. The present invention is directed toward solution of the aforementioned problems and deficiencies.

SUMMARY OF THE INVENTION

The present invented dispensing device includes a cap member superimposed on a base member and defining at their mating surfaces a channel in which is slidably mounted a metering member the upper and lower surfaces of which bear against low-friction surfaces of resilient inserts such as plastic inserts.

The lower surface of the cap member and the upper surface of the base member each have a straight-line slot extending thereacross defining a cavity. Plastic inserts having a low-friction surface are disposed in the cavities.

The cap member is superimposed on the base member with their complementary surfaces in mating engagement and with their straight-line slots in registry to form a channel. An inlet passageway extends from the upper surface of the cap member, downwardly therethrough and through one of the inserts into communication with the top of the channel. An outlet passageway extends downwardly from the bottom of the channel, in spaced-apart relationship from the inlet passageway, through the second insert and the base member and terminates in the lower surface of the base member.

An elgongate sliding metering bar adaptable for movement within the channel contains a transfer passageway which extends from the upper surface to the lower surface of the bar. The volume of the transfer passageway corresponds to the measured volume of powder which it is desired to dispense. The main body portion of the sliding metering bar is sized to closely fit the channel and is slidably mounted therein for movement between a first position wherein the transfer passageway is in registry with the bottom of the inlet passageway in the overlying cap member, and a second position wherein the transfer passageway is in registry with the top of the outlet passageway in the underlying base member.

Application to the inlet passageway of a supply of powder, in excess of the measured volume, will fill the metering bar transfer passageway when it is moved to the first position. Movement of the metering bar to the second position allows the powder to pass through the outlet passageway.

The use of plastic inserts each having a peripheral trough and a rim disposed about the trough enables closer tolerances with reduced wear. The peripheral troughs and rims of the insert members efficiently function to catch what little powder does pass between the sliding member and the channel walls, the combination of closer tolerances and the troughs resulting in an extremely low escape of powder from the channel. The inserts are coated with polytetrafluoroethylene (Teflon) and waxed to further reduce friction.

Closer tolerance and ease of assembly between the surfaces of the metering bar and the resilient inserts is easily and inexpensively achieved by using a somewhat resilient, low-friction plastic material, such as urethane for example, the inserts being fabricated slightly thicker so that they are slightly compressed by the surfaces of the sliding member. Hence, no precise fitting and matching is necessary. Posts disposed between the cap member and base member are secured in place when the proper pressure is applied to the metering bar eliminating the need for shims or other means of handling the inherent differences in tolerances of plastic parts.

BRIEF DESCRIPTION OF THE DRAWING

FIG. 1 is a perspective view of a dispensing device in accordance with the present invention concepts;

FIG. 2 is a view taken along the line 2—2 of FIG. 1;

FIG. 3 is a view taken along the line 2—2 of FIG. 1, with a sliding member moved to a different position; and, FIG. 4 is an exploded view of the device.

FIG. 5 is a cross-sectional view of the lower plastic insert.

DESCRIPTION OF THE PREFERRED EMBODIMENT

Turning first to FIG. 4 of the drawings, there is shown an exploded perspective view of a presently preferred embodiment of a powder-dispensing device in accordance with the present invention concepts, the main components of which basically comprise a cap member generally indicated by the reference numeral 10, a first insert member 20, a sliding metering member 30, a second insert member 40 and a base member 50. The base and cap members may be molded of a plastic material, or may be metal parts. The cap member 10 has an upper surface 11 and a lower surface 12. The lower surface 12 is planar and defines a straight-line slot 13 extending thereacross with the bottom surface 14 thereof intersecting a central cavity 15 of rectangular cross section, as can best be seen in FIGS. 2 and 3.

Extending through cap member 10 from upper surface 11 is an inlet passageway 16 defining an upper portion 16a, of circular cross section and threaded to receptively engage the neck of a screw top powder container, and a lower portion 16b of generally rectangular configuration and smaller cross-sectional area and terminating in cavity 15. Four apertures 35 are disposed through cap member 10 from an upper surface of the cap to the lower surface 12. The apertures 35 are disposed such that they do not communicate with cavity 15 and such that they are in alignment with posts 34 of lower member 50.

Fitted into the central cavity 15 of cap member 10 is the first insert member 20, the member 20 being of rectangular configuration and having an upper surface 21 and a lower surface 22. An aperture 25 extends through the first insert member, the aperture defining a larger upper end at surface 21 of substantially the same size as the inlet passageway lower portion 16b and in registry therewith, and a smaller lower end at surface 22. A continuous trough 27 is defined in lower surface 22, the trough extending around the periphery thereof to form a rectangular outline. A rim is disposed about the trough 27. The thickness of the first insert member 20 is such that when it is fitted into place in cavity 15 its lower surface 22 will be in substantial alignment with the bottom surface 14 of the slot 13 in the cap member. (The configuration of insert member 20 may be substantially identical to insert member 40; insert member 40 shall be described in detail in conjunction with FIG. 5.)

The base member 50 has an upper surface 51 and a lower surface 52, the upper surface 51 being planar and defining a straight-line slot 53 extending thereacross with the bottom surface 54 thereof intersecting a generally rectangular central cavity 55.

Extending through base member 50 from cavity 55 to lower surface 52 is an outlet passageway 56 of substantially circular uniform cross section. The upper surface 51 also defines four posts 34 which are rigidly affixed to surface 51 of member 50.

Posts 34 are in alignment with apertures 35 of cap member 10 and as adaptable for engaging these apertures when the cap member is superimposed upon the base member as indicated in FIG. 1. The cap member slot 13 and the base member slot 53 are of identical width and form a channel when the cap and base members are so assembled.

Fitted into the central cavity 55 of base member 50 is the second insert member 40, the member 40 being of similar configuration to the first insert member 20 and having an upper surface 41 and a lower surface 42. An aperture 45 extends through the second insert member, the aperture being of circular cross section of the same size as the base member outlet passageway 56 and in registry therewith. Referring to FIGS. 4 and 5 a continuous trough 47 is defined in upper surface 41, the trough extending around the periphery thereof to form a rectangular outline. A rim 44 is disposed about the entire periphery of the trough 47. In the presently preferred embodiment the rim 44 is approximately 0.003 inches higher than the surface 41. The area within trough 47 should be such that the passageway 35 remains within the interior of the area defined by the trough 47 during its movement. The thickness of second insert member 40 is such that when it is fitted into place in cavity 55 its upper surface 41 will be in substantial alignment with the bottom surface 54 of the slot 53 in the base member. The insert members 20 and 40 are preferably made of a somewhat resilient material, such as a plastic, for example, a urethane or polyethylene in order to provide a compressible, smooth and long wearing surface upon which sliding member 30 slides. A rubber or synthetic rubber such as neoprene may be used for the inserts. It has been found that better performance is achieved when the inserts 20 and 40 are coated with polytetrafluoroethylene (Teflon); a coating of about 0.001 inches or less is satisfactory. Additionally a thin coating of lubricant over the polytetrafluoroethylene and also over the metering member 30 is also desirable. A waxlike material may be used in this application.

Metering bar or member is preferably fabricated of metal, such as steel or aluminum for example, and defines a main body portion 31 of rectangular cross section intermediate an actuating end portion 32 and a stop end portion 33. The main body portion 31 is sized to fit the channel defined by cap member slot 13 and base member slot 53 when the cap member is superimposed on the base member as shown in FIG. 1, and has an upper surface 37 and a lower surface 38, these upper and lower surfaces being honed or lapped to provide smooth, low-friction sliding contact with the insert member surfaces 22 and 41.

The main body portion 31 defines a transfer passageway 35 therethrough between upper surface 37 and lower surface 38, the diameter of transfer passageway 35 being such that in conjunction with the thickness of the main body portion a volume is formed equal to the desired volume of powder to be dispensed. The diameter of aperture 45 through the second insert member 40 is at least equal to, and preferably slightly greater than, the diameter of transfer passageway 35, the cross-sectional area of the smaller lower end of the first insert member aperture 25 being at least equal to, and preferably slightly greater than, the cross-sectional area of transfer passageway 35, in order to provide a funnellike effect for efficient filling and emptying of powder from the transfer passageway.

As can best be seen in FIGS. 2 and 3, the first insert member aperture 25 is displaced from the second insert member aperture 45 along the length of the channel formed when cap member 10 is mounted atop base member 50, i.e., the inlet passageway is displaced from the outlet passageway.

Stop member end portion 33 is of larger cross section than that of the channel to limit leftward movement of metering member 30 to that position shown in FIG. 2, wherein transfer passageway 35 is in register with the inlet passageway in the first insert member 20. The actuating end portion 32 is in the form of a small diameter rod adapted for coupling to a plunger mechanism or for manual operation for selectively moving the sliding metering member 30 to the position shown in FIG. 3, wherein transfer passageway 35 is in registry with the termination of the outlet passageway in second insert member 40.

In operation, a screw top container of powder is mounted in an inverted position to cap member 10 by threading its neck portion into the upper portion 16a of inlet passageway 16, whereby the powder will gravitate into and fill the inlet passageway. Should metering member 30 happen to be in the position shown in FIG. 3, the powder will rest upon the upper surface 37 until the sliding member is moved to the FIG. 2 position, whereupon the powder will gravitate into and fill the transfer passageway 35, the powder then resting on upper surface 41 of second insert member 40. Upon subsequent movement of sliding member 30 toward the position of FIG. 3, the volume of powder in the transfer passageway 35 will be moved out from under the inlet passageway 16, further graviation of powder through the inlet passageway being prevented since the sliding member upper surface 37 effectively seals off the termination of the aperture 25. The volume of powder in transfer passageway 35 is retained therein by the sliding contact between second insert member upper surface 41 and sliding member lower surface 38. Actuating end portion 32 may also have a stop means to prevent the metering member 30 from being urged into the channel such that passageway 35 moves to the right of outlet passageway 56. In FIG. 1 a second inlet 23 is illustrated which is coupled to a mercury or other liquid dispenser; end portion 32 is actuated simultaneously with the liquid dispenser since it is coupled to the liquid dispenser thus allowing a liquid and powder to be simultaneously dispensed.

As the sliding member reaches the position of FIG. 3 the second insert member aperture 45 becomes uncovered, thereby allowing the powder carried in transfer passageway 35 to gravitate through the outlet passageway 56 and thus be dispensed. Any small amount of powder working its way between the sliding member upper surface 37 and the first insert member lower surface 22, and between the sliding member lower surface 38 and the second insert member upper surface 41, upon movement of the sliding member will be trapped in the insert member troughs 27 and 47 by the rims which surround the troughs and so prevented from escaping from the ends of the channel. This is particularly true for the very fine powder and spherical alloys of a few microns in diameter.

In use, in the presently preferred embodiment, the liquid and powder dispenser are inverted after each dispensing operation; that is the entire device is rested or stored on the ends of the powder and liquid containers opposite the inlet passageways, this allows the powder in the container to be agitated and more completely fill the inlet passageway.

One method of assembling the device which has eliminated the need for shims is obtained by use of the posts 34. When the device is assembled and the posts 34 are disposed through the aperture 35 the cap member 10 and base member 50 are compressed until the corrected pressures is applied to the metering member 30. When the correct pressure is applied, the cap member 10 is secured to the posts 34. The desired or correct pressure can be determined by manually sliding the metering member until it feels as if it has the correct pressure. The compression of the cap and base may be performed manually by squeezing these members while sliding the metering member to check for the correct pressure. The correct pressure is the pressure at which the member 30 may be comfortably moved manually and at which the inserts are securely pressed against the member 30 to prevent the escape of powder. The posts 34 may be rigidly secured to the cap member 10 by melting the plastic posts 30 against the cap member by the application of heat or with the use of a solvent that dissolves the plastic such as acetone.

As an alternative to fabricating the insert members slightly thicker and relying upon surface compressibility from posts 34 for achievement of the desired close sliding contact between the surfaces of the sliding metering member and the insert members, the insert members can be slightly thinner and shims may be used to urge the insert members against the surfaces of the sliding member for the desired sliding contact.

I claim:

1. In a powder-dispensing device comprising a sliding metering member defining a volume disposed therethrough, an upper member having an inlet passageway and a lower member having an outlet passageway; said passageways being spaced apart such that the volume may be moved into registry with either of said passageways; the improvement comprising the use of at least one resilient insert disposed between said metering member and at least one of said other members, said insert containing an aperture such that said passageway communicates with said volume through said aperture when said volume is in registry with said passageway and a surface for slidingly engaging said metering member and wherein said surface includes a rim extending outwardly above said surface, said rim enclosing at least the surface of said insert over which said volume moves.

2. The improvement defined in claim 1 wherein said surface of said insert engaging said metering member contains a continuous trough disposed within said rim.

3. The improvement defined in claim 2 wherein said surface of said insert interior to said trough is flat.

4. A device for dispensing a measured volume of a powder comprising, in combination:
   a. a cap member having an upper surface, and a lower surface defining a straight-line slot extending thereacross with the bottom surface of the slot intersecting a central cavity, said cap member further defining an inlet passageway extending therethrough and terminating at one end in said upper surface and at the other end in said cavity;
   b. a first insert member comprising a resilient material filling said cap member cavity and defining an aperture therethrough in register with the termination of said cap member passageway, said first insert member having a lower surface in substantial alignment with the bottom surface of said cap member slot and defining a continuous trough therein adjacent the periphery thereof;
   c. a base member having a lower surface, and an upper surface complementary to the lower surface of said cap member and defining a straight-line slot extending thereacross with the bottom surface of the slot intersecting a central cavity, said base member further defining an outlet passageway extending therethrough and terminating at one end in said cavity and at the other end in said lower surface;
   d. a second insert member comprising a resilient material filling said base member cavity and defining an aperture therethrough in register with the termination of said base member passageway, said second insert member having an upper surface in substantial alignment with the bottom surface of said base member slot and defining a continuous trough therein adjacent the periphery thereof;
   e. said cap member being superimposed on said base member with their complementary surfaces in mating engagement and with their straight-line slots in registry to form a channel, and with the apertures through their insert members being displaced from each other along the length of the channel; and,
   f. an elongate straight-sided sliding member including a main body portion having an upper surface complementary to the bottom surface of said cap member slot and the lower surface of said first insert member, and having a lower surface complementary to the bottom surface of said base member slot and the upper surface of said second insert member, said main body portion defining a transfer passageway therethrough terminating at one end in said upper surface and at the other end in said lower surface, the volume of said transfer passageway corresponding to said measured volume of powder;
   g. said main body portion being sized to fit said channel and being slidably mounted therein for longitudinal movement between a first position wherein said transfer passageway is in registry with the aperture through said first insert member and a second position wherein said transfer passageway is in registry with the aperture through said second insert member, whereby when powder is applied to the inlet passageway of said cap member and said sliding member moved to said first position a quantity of powder will gravitate through said inlet passageway and fill the transfer passageway of said sliding member, subsequent movement of said sliding member toward said second position carrying a measured volume of said powder in said transfer passageway, said measured volume of powder gravitating from said transfer passageway through the aperture in said second insert member and discharging through the outlet passageway in said base member when said sliding member reaches said second position.

5. A device as defined in claim 4, wherein said cap member lower surface and said base member upper surface are planar and the straight-line slots defined therein are of uniform rectangular cross section.

6. A device as defined in claim 5 wherein a rim is disposed about the periphery of said trough on said inserts.

7. A device as defined in claim 5, wherein the upper surface of said cap member is adapted for receptive engagement of the opening of a powder container.

8. A device as defined in claim 6, wherein the uppermost portion of said cap member inlet passageway is threaded to receive the neck of a screw top powder container.

9. A device as defined in claim 7, wherein said cap member is secured to said base member by posts disposed through at least one of said member and secured to that member.

10. A device as defined in claim 4, wherein said sliding member is of metal and said insert members are of a plastic material.